(12) United States Patent
Matsuoka et al.

(10) Patent No.: US 8,475,620 B2
(45) Date of Patent: Jul. 2, 2013

(54) BAG MEMBER FOR COMPRESSION PREBONDING, HOLDING TOOL FOR PRODUCING LAMINATED GLASS, AND DEVICE OF PRODUCING LAMINATED GLASS AND METHOD OF PRODUCING THE SAME

(75) Inventors: Hiroyuki Matsuoka, Tokyo (JP); Tsutomu Anbo, Tokyo (JP); Shigeru Hirata, Yokohama (JP); Tsutomu Mizukami, Osaka (JP); Yoshiyuki Sato, Osaka (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/611,972

(22) Filed: Sep. 12, 2012
(Under 37 CFR 1.47)

(65) Prior Publication Data
US 2013/0032291 A1 Feb. 7, 2013

Related U.S. Application Data

(60) Division of application No. 13/067,760, filed on Jun. 23, 2011, now Pat. No. 8,287,683, which is a continuation of application No. PCT/JP2009/071065, filed on Dec. 17, 2009.

(30) Foreign Application Priority Data

Dec. 24, 2008 (JP) .................................. 2008-327866

(51) Int. Cl.
| | | |
|---|---|---|
| B29C 65/00 | (2006.01) |
| B29C 45/00 | (2006.01) |
| B29C 47/00 | (2006.01) |
| B29C 39/02 | (2006.01) |
| B29C 43/02 | (2006.01) |
| B29C 49/00 | (2006.01) |
| B29C 49/08 | (2006.01) |
| B32B 17/00 | (2006.01) |
| B32B 37/00 | (2006.01) |
| B32B 17/10 | (2006.01) |
| C03C 27/00 | (2006.01) |
| G02C 7/00 | (2006.01) |
| B29C 67/00 | (2006.01) |
| B29C 51/00 | (2006.01) |
| B29C 39/14 | (2006.01) |
| B29C 55/00 | (2006.01) |
| B29C 67/20 | (2006.01) |
| B29C 43/10 | (2006.01) |
| B29D 22/00 | (2006.01) |
| B29D 24/00 | (2006.01) |
| B29D 29/00 | (2006.01) |
| B29D 7/00 | (2006.01) |
| B29B 15/00 | (2006.01) |

(52) U.S. Cl.
USPC ............. 156/285; 156/104; 156/99; 156/286; 156/382; 264/511; 264/526; 264/553; 264/566; 264/568; 264/571

(58) Field of Classification Search
USPC ............ 156/104, 99, 285, 286, 382; 264/511, 264/526, 553, 566, 568, 571
See application file for complete search history.

(56) References Cited

U.S. PATENT DOCUMENTS 2,837,453 A * 6/1958 Englehart et al. ............. 156/102
4,601,772 A * 7/1986 McKelvey ................... 156/382

FOREIGN PATENT DOCUMENTS

| JP | 05-238784 | 9/1993 |
| JP | 06-345498 | 12/1994 |
| JP | 2001-294451 | 10/2001 |
| JP | 2004-018293 | 1/2004 |
| JP | 2005-104821 | 4/2005 |
| JP | 2006-137625 | 6/2006 |

OTHER PUBLICATIONS

Mizukami, Tsutomu. "Heating and Pressurizing Bag for Manufacturing Laminated Sheet Glass." Publication date: Jun. 1, 2006. Japanese Publication number: 2006-137625 Claims.*

Mizukami, Tsutomu. "Heating and Pressurizing Bag for Manufacturing Laminated Sheet Glass." Publication date: Jun. 1, 2006. Japanese Publication number: 2006-137625 Drawings.*

Mizukami, Tsutomu. "Heating and Pressurizing Bag for Manufacturing Laminated Sheet Glass." Publication date: Jun. 1, 2006. Japanese Publication number: 2006-137625 Detailed Description.*

International Search Report in PCT/JP2009/071065 dated Mar. 23, 2010.

Non-Final Office Action U.S. Appl. No. 13/067,760 dated Apr. 6, 2012.

Notice of Allowance U.S. Appl. No. 13/067,760 dated Jun. 12, 2012.

* cited by examiner

*Primary Examiner* — Christopher Schatz
*Assistant Examiner* — Matthew Hoover
(74) *Attorney, Agent, or Firm* — Foley & Lardner LLP

(57) ABSTRACT

A holding tool 2 for use in producing of laminated glass includes a frame 3, a bag member 4 and a supporting member 6b for suspending the bag member 4 from the frame 3. The bag member 4 is made of a film with flexibility and airtightness, is provided with a sealable opening and has evacuating ports 7a and 7b in the vicinity of an periphery of a flat shape thereof having the periphery sealed. The frame 3 has a first frame member 3w and a second frame member 3y opposing each other and disposed outside the periphery of the bag member 4, and the bag member 4 is suspended by the supporting member 6b movably against the frame 3 on a holding face formed at least by the first frame member 3w and the second frame member 3y inside an area formed by connecting ends of these frame members.

7 Claims, 9 Drawing Sheets

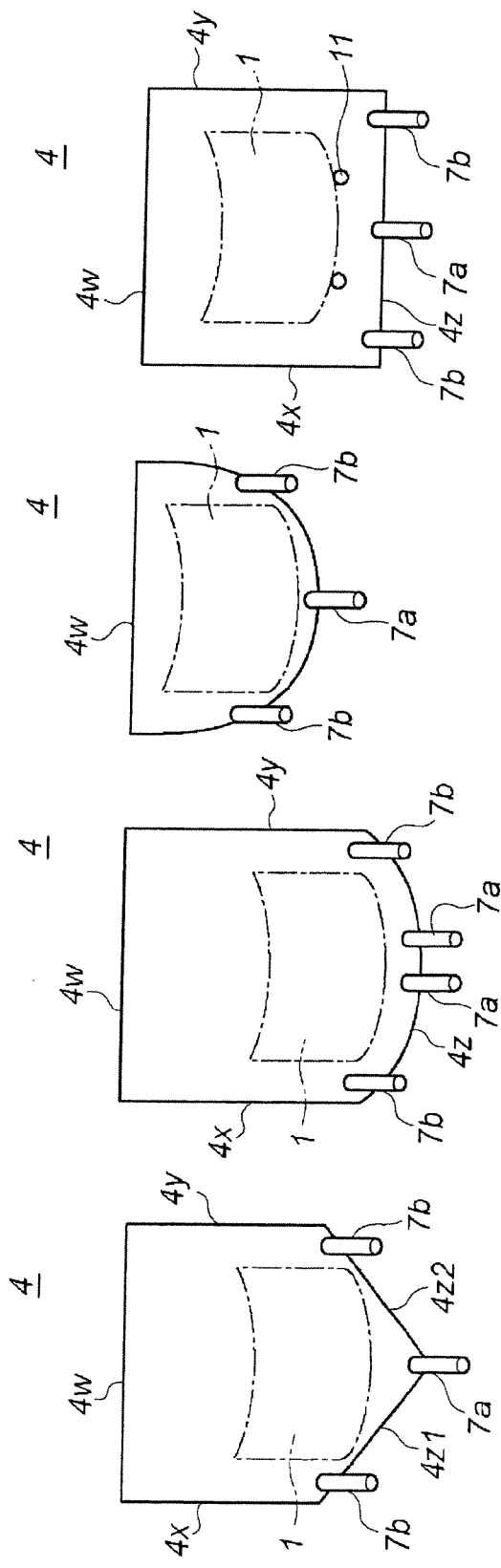

BAG MEMBER FOR COMPRESSION PREBONDING, HOLDING TOOL FOR PRODUCING LAMINATED GLASS, AND DEVICE OF PRODUCING LAMINATED GLASS AND METHOD OF PRODUCING THE SAME

CROSS REFERENCE TO RELATED APPLICATIONS

This application is a divisional application of U.S. Ser. No. 13/067,760 filed Jun. 23, 2011, which is U.S. Pat. No. 8,287,683 granted on Oct. 16, 2012, which is a Continuation Application of PCT/JP2009/071065 filed Dec. 17, 2009, which claims priority to Japanese Patent Application No. 2008-327866 filed Dec. 24, 2008. The subject matter of each of the above-referenced applications is incorporated in entirety by reference.

TECHNICAL FIELD

The present invention relates to a bag member for pre-pressing used in producing of laminated glass, a holding tool for use in the producing of laminated glass, and a device and a production method for laminated glass using the holding tool. More specifically, the present invention relates to a bag member for pre-pressing used in a pre-pressing process for performing temporary press bonding by pressurizing and heating an unbonded body during the producing of laminated glass, a holding tool for use in producing of laminated glass using the bag member for pre-pressing, and a device and a production method for laminated glass using the holding tool for use in producing of laminated glass.

BACKGROUND ART

Laminated glass is a glass sheet in which two or more glass sheets are laminated with a resin film of polyvinyl butyral or the like sandwiched therebetween. Therefore, the laminated glass has characteristics that it is difficult to be perforatedly broken, and that even if it is damaged, it may keep its original shape while cracked but not scattered in pieces. Accordingly, the laminated glass is widely used as window glass of an automobile, window glass of a railroad car, a windshield of an aircraft, a porthole, glass for a water tank, window glass of a building, security glass and the like.

Some of producing methods for laminated glass include a process for pre-pressing two or more glass sheets with a resin film sandwiched therebetween. In the process for pre-pressing, for example, an unbonded body including two or more glass sheets laminated with a resin film sandwiched therebetween is placed in a bag (a bag member) for use in producing of laminated glass. Next, air remaining in the bag member is evacuated, so as to press the unbonded body with the bag member. Subsequently, the unbonded body closely adhered by pressurizing may be heated while keeping the pressure so as to perform the pre-pressing. A holding tool for the pre-pressing used in such a production method for laminated glass is required to apply a pressure evenly to the whole surface of the glass sheets with the atmospheric pressure by evacuating air from the bag member. Therefore, it may be made of a laminated cloth in which a rubber or synthetic resin film with flexibility and airtightness is laminated on both faces of a base cloth. Alternatively, a film used in the bag member may be further provided with stretching properties as far as it is a material having flexibility and airtightness. In this case, when the stretching properties are limited to a prescribed range, the position for holding the unbonded body may be preferably stabilized.

Patent Document 1 mentioned below discloses an exemplary case in which an unbonded body including two or more glass sheets laminated with a resin film sandwiched therebetween is placed in a heating/pressing bag for use in producing of laminated glass and the heating/pressing bag for use in producing of laminated glass is attached to two pairs of endless track rotating along a horizontal plane in the pre-pressing process. The structure of the heating/pressing bag for use in producing of laminated glass disclosed in Patent Document 1 is illustrated in FIG. 11. The bag 17 of FIG. 11 is in a substantially square shape, has an opening on one side 14 and is closed on the other side 15 and upper and lower sides 12 and 13. The bag 17 is suspended down from a rail 18 with a plurality of suspending tools 19. The plural suspending tools 19 are a plurality of springs for attaching the upper side 12 alone out of the four sides of the bag 17 to the rail 18. On the other hand, the bag 17 has evacuating ports 16 for evacuating the bag 17 in the vicinity of the ends of the lower side 13 disposed in a lower position when suspended. The opening of the bag 17 is disposed on a right/left side of the suspending bag 17, namely, on the side 14, and is closed/opened with shape retention rods 10a and 10b. A shape retention rod 10c is adhered to the other closed side 15, and the upper end of the shape retention rod 10c is fit in the rail 18.

PRIOR ART REFERENCE

Patent Document

Patent Document 1: Japanese Laid-Open Patent Publication No. 2006-137625

SUMMARY OF THE INVENTION

Problems to be Solved by the Invention

From the viewpoint of diversification of design of automobiles, improvement in aerodynamic characteristics, improvement in forward visibility, consideration for the safety of pedestrians and the like, windshields largely bent and having a large curvature and in a shape including double curved surfaces three-dimensionally bent (hereinafter referred to as the deep curved shape) are recently used frequently. Most of conventional laminated glass has a bend depth smaller than 150 mm. This bend depth is compared in accordance with a length H illustrated in FIG. 10. The length H is a value corresponding to the extent of bend of laminated glass indicated by the height of its upper periphery when the laminated glass is placed on a surface plate in a convex state. Therefore, even when the conventional bag for use in producing of laminated glass described in Patent Document 1 is used, the quantity of air to be evacuated from the bag for use in producing of laminated glass is smaller as compared with the case where laminated glass in the deep curved shape is used, and hence, the air may be sufficiently evacuated through the two evacuating ports 16 disposed in the vicinity of the ends on the lower periphery of the bag for use in producing of laminated glass.

The bend depth H of a recent automotive windshield is, however, required to be much larger than 150 mm, namely, the so-called deep curved shape is required. Furthermore, the bend shape of such a windshield is generally different among types of automobiles.

The bag 17 described in Patent Document 1 is provided with the shape retention rods 10a and 10b in the opening of the bag as illustrated in FIG. 11. Therefore, it is difficult to widely open the opening, and hence, as the curved shape and the curvature of the unbonded body 1 are larger, it is more difficult to place it therein. Furthermore, the bag 17 is suspended on the merely one side 12 through the suspending tools 19 from the rail 18. Therefore, the bag 17 may be moved merely in a small range, and hence, the bag 17 cannot sufficiently follow the shape of the unbonded body 1 and the state of the unbonded body 1 placed therein is various. Moreover, since the bag 17 is suspended on the merely one side 12 and the other sides are not provided with the suspending tools 19, the bag tends to be crumpled. As a result, in using the bag 17 for use in producing of laminated glass described in Patent Document 1, as the unbonded body 1 is in a more deep curved shape, it is more difficult to evenly apply a pressure to the whole surface of the unbonded body 1 in which the glass sheets and the resin film are laid up.

Moreover, the bag 17 for use in producing of laminated glass of FIG. 11 is provided with the evacuating ports 16 in the vicinity of the ends of the sides of the bag. Therefore, as the unbonded body 1 is in a more deep curved shape, air is more likely to remain in a center portion of the bag 17 for use in producing of laminated glass, which makes contact between the unbonded body 1 and the bag 17 uneven and wrinkle, and as a result, there arises a problem that a pressing force is uneven or a glass sheet is broken.

FIGS. 12A through 12C are schematic diagrams illustrating evacuation performed in the pre-pressing of an unbonded body 1 in a deep curved shape by using the bag 17 for use in producing of laminated glass described in Patent Document 1. FIGS. 12A through 12C are all cross-sectional views of the bag 17 for use in producing of laminated glass of FIG. 11 taken on line C-C from a direction of arrows, and specifically, FIG. 12A illustrates a state attained before evacuation, FIG. 12B illustrates a state where the evacuation has started and the quantity of air is slightly reduced, and FIG. 12C illustrates a state where the evacuation is further proceeded.

When the air is evacuated through the evacuating ports 16 provided in the vicinity of the ends of the lower periphery of the bag 17 for use in producing of laminated glass from the state illustrated in FIG. 12A, the air is evacuated first from both a center space I and a peripheral space O inside the bag, resulting in attaining the state of FIG. 12B. In the state of FIG. 12B, one rubber-coated cloth (a lower rubber-coated cloth in the drawing) of the bag 17 for use in producing of laminated glass is in contact with the unbonded body 1. The bag 17 for use in producing of laminated glass is not provided with an evacuating port in a center portion on the lower periphery. Therefore, in the state of FIG. 12B, the air is minimally evacuated from the center space I of the bag and is mainly evacuated from the peripheral space O. As a result, excessively large stress is applied to the end of the unbonded body 1 in contact with the rubber-coated cloth, which sometimes breaks the glass. Furthermore, even when the state of FIG. 12C is attained through the further evacuation, a portion of the center space I surrounded with the unbonded body 1 is insufficiently evacuated, and therefore, the bag 17 for use in producing of laminated glass remains to be stretched between the ends of the unbonded body and is not brought to close contact with the unbonded body 1. In this case, since the unbonded body 1 is heated without sufficiently pressing the unbonded body 1 by the bag 17 for use in producing of laminated glass, the pre-pressing process for the unbonded body 1 is completed with the press bonding between the glass sheets insufficient. As a result, the thus obtained pre-pressed body may be insufficiently bonded.

On the other hand, when the performance of the evacuation in the pre-pressing process is increased in order to prevent the aforementioned insufficient pressing, stress caused by the evacuation is collected on a bent portion with a large curvature of the pre-pressed body or on the end of the unbonded body, so as to cause a trouble of breaking the glass sheet of the unbonded body 1, and therefore, it is difficult to solve this problem by merely changing the conditions for the evacuation.

The present invention was devised in consideration of the aforementioned problems for realizing pre-pressing in which a pressing force applied to an unbonded body through evacuation is made even by reducing dispersion in stress applied from a frame to a bag member even when the unbonded body is in a deep curved shape. Furthermore, an object of the invention is providing a holding tool for use in producing of laminated glass with which even pre-pressing may be performed on unbonded bodies in various curved shapes and an unbonded body is not cracked during the pre-pressing process and which may be easily handled, and a producing method using the holding tool.

In another aspect of the present invention, an object is providing an inexpensive holding tool for use in producing of laminated glass to be employed in continuous producing using a plurality of holding tools by employing a structure in which a distance therebetween may be easily retained and evacuation may be highly efficiently performed and which is simple and minimally has trouble, and a producing method using the holding tool.

In another aspect of the invention, an object is providing a device for producing laminated glass capable of performing pre-pressing evenly on any of various curved shapes and not causing crack in the pre-pressing process.

In still another aspect of the invention, an object is providing a bag member for pre-pressing to be used in producing of laminated glass in which a pressure may be evenly applied to a pre-pressed body and a pre-pressed body may be produced without causing a pressing failure.

Solution to the Problems

A first aspect of the invention provides a holding tool for use in producing of laminated glass used in a process of pre-pressing of an unbonded body in which one or a plurality of glass sheets and at least one resin film are laid up, including a bag member; a frame; and a supporting member for suspending the bag member from the frame, wherein the bag member is a flat-shaped bag member made of a film with flexibility and airtightness, is provided with a sealable opening on a first side of a circumference of the bag member, has a sealed periphery on sides excluding the first side, and is provided with an evacuating port for evacuating air from the bag member, the frame includes at least a first frame member and a second frame member disposed to oppose each other, with the first frame member and the second frame member disposed outside the periphery of the bag member, and the bag member is suspended by the supporting member movably against the frame inside an area formed by connecting ends of the first frame member and the second frame member to each other in a plan view taken from a normal direction of a holding face formed by the first frame member and the second frame member.

A second aspect of the invention provides the holding tool for use in producing of laminated glass according to the first aspect, wherein the supporting member is an elastic body.

A third aspect of the invention provides the holding tool for use in producing of laminated glass according to the first or second aspect, wherein the frame further includes a third frame member provided substantially in parallel to the opening to be engaged with the bag member for sealing the bag member; and a fourth frame member disposed substantially in parallel to the opening and disposed outside the sealed periphery of the bag member, and the holding tool further comprises a flexible supporting member suspended from a plurality of frame members out of the first through fourth frame members for supporting the bag member.

A fourth aspect of the invention provides the holding tool for use in producing of laminated glass according to any of the first through third aspects, further including a non-stretching supporting member for hanging the bag member on the first, second and/or fourth frame members for supporting the bag member.

A fifth aspect of the invention provides the holding tool for use in producing of laminated glass according to any of the first through fourth aspects, wherein the evacuating port is provided in at least one of a first area and a second area, the first area being an area corresponding to a center part and not in contact with the unbonded body and the second area being an area corresponding to end parts and not in contact with the unbonded body out of areas of the bag member obtained by dividing, by a length obtained by equally dividing the first side into four pieces, the area formed by connecting the ends of the first frame member and the second frame member to each other in a direction perpendicular to the first side.

A sixth aspect of the invention provides the holding tool for use in producing of laminated glass according to any of the first through fourth aspects, wherein the evacuating port is provided in at least one of a second area and a first area, the second area being an area corresponding to end parts, not in contact with the unbonded body and disposed within 800 mm from the periphery in parallel to the first and second frame members out of areas of the bag member obtained by dividing, in a direction perpendicular to the first side, the area formed by connecting the ends of the first frame member and the second frame member to each other, and the first area being an area corresponding to a center part excluding the second area and not in contact with the unbonded body.

A seventh aspect of the invention provides a device for producing laminated glass using the holding tool for use in producing of laminated glass of any of the first through sixth aspects, including evacuating means for evacuating the bag member through the evacuating port; and heating means for heating the bag member.

An eighth aspect of the invention provides a bag member for use in pre-pressing capable of heating and pressing an unbonded body in which one or a plurality of glass sheets and at least one resin film are laid up, the bag member being made of a film having flexibility and airtightness, having a sealable opening on a first side and being in a flat shape having a sealed periphery excluding the first side, the bag member including at least one evacuating port in a first area that is an area corresponding to a center part and not in contact with the unbonded body out of areas of the bag member obtained by dividing, by a length obtained by equally dividing the first side into four pieces, an area formed by connecting ends of a second side and a third side extending from ends of the first side of the periphery to each other in a direction perpendicular to the first side.

A ninth aspect of the invention provides a bag member for use in pre-pressing capable of heating and pressing an unbonded body in which one or a plurality of glass sheets and at least one resin film are laid up, the bag member being made of a film having flexibility and airtightness, having a sealable opening on a first side and being in a flat shape having a sealed periphery excluding the first side, the bag member comprising at least one evacuating port provided in at least one of a second area and a first area, the second area being an area corresponding to end parts of an area of the bag member formed by connecting ends of a second side and a third side extending from ends of the first side to each other, not in contact with the unbonded body and disposed within 800 mm from the second and third sides, and the first area being an area corresponding to a center part excluding the second area and not in contact with the unbonded body.

A tenth aspect of the invention provides the bag member for use in pre-pressing according to the eighth or ninth aspect, further including another evacuating port provided in the second area corresponding to the end parts and not in contact with the unbonded body out of the divided areas of the bag member.

An eleventh aspect of the invention provides a production method for laminated glass including a step of performing pre-pressing by using a holding tool for pre-pressing capable of heating and pressing, wherein the holding tool includes a frame, a bag member and a supporting member for suspending the bag member from the frame, the bag member is made of a film with flexibility and airtightness, is provided with a sealable opening on a first side, is in a flat shape having a sealed periphery excluding the first side, and includes an evacuating port in the vicinity of the sealed periphery, the frame includes at least a first frame member and a second frame member disposed to oppose each other, with the first frame member and the second frame member disposed outside the periphery of the bag member, the bag member is suspended by a supporting member movably against the frame inside an area formed by connecting ends of the first frame member and the second frame member to each other in a plan view taken from a normal direction of a holding face formed by the first frame member and the second frame member, the step of performing the pre-pressing includes at least steps of placing an unbonded body in the holding tool; sealing the opening of the bag member; pressing the unbonded body by evacuating the bag member; heating the bag member; and taking out a pre-pressed body resulting from the pre-pressing out of the holding tool.

A twelfth aspect of the invention provides the production method for laminated glass according to the ninth aspect, wherein the bag member includes at least one evacuating port in a first area that is an area corresponding to a center part and not in contact with the unbonded body out of areas of the bag member obtained by dividing, by a length obtained by equally dividing the first side into four pieces, the area formed by connecting the ends of the first frame member and the second frame member to each other in a direction perpendicular to the first side, and the step of pre-pressing the unbonded body is a step of pre-pressing the unbonded body with the atmospheric pressure by evacuating the bag member through the first evacuating port.

A thirteenth aspect of the invention provides the production method for laminated glass according to the twelfth aspect, wherein the bag member further includes a second evacuating port in a second area that is an area corresponding to end parts and not in contact with the unbonded body out of the divided areas of the bag member, and air present around the unbonded body is evacuated preferentially through the first evacuating port by making a quantity of air to be evacuated and/or timing for starting evacuation different between the first evacuating port and the second evacuating port in the step of pre-pressing the unbonded body.

Effects of the Invention

According to the first aspect of the invention, even when the unbonded body is in a deep curved shape, since the bag member may be largely opened, the unbonded body may be easily placed in the bag member, and in addition, due to deflection caused in the bag member in accordance with the bend of the unbonded body placed in the bag member, the bag member follows the bend of the unbonded body also after placing it therein. Therefore, the unbonded body may be placed in the bag member with occurrence of unwanted stress reduced.

Furthermore, even when the unbonded body is in a more deep curved shape, in a curved shape bilaterally asymmetric, or in a shape having more complicated double curved surfaces, the shape of the periphery of the bag member with flexibility is changed so as to follow the shape of the unbonded body. Moreover, on a plan view taken from a normal direction of a holding face, the bag member is moved against the frame freely inside a substantially square area formed by connecting the ends of the frame members, so as to adjust the distance from the frame. Accordingly, dispersion in stress applied to the bag member by the frame is reduced, and it is possible to perform pre-pressing in which a pressing force applied to the unbonded body by the evacuation is made even. As a result, the pre-pressing may be performed evenly on unbonded bodies in various curved shapes. Accordingly, the glass sheet included in the unbonded body is prevented from cracking in the pre-pressing process, and thus, it is possible to provide a holding tool for use in producing of laminated glass easily dealt with.

According to the second aspect of the invention, since the elastic body is used as the supporting member, a distance of the bag member from the frame is autonomously determined through balance between a force applied from the frame to the bag member and a force of deforming the elastic body, and thus, the position for supporting the bag member is stabilized. Furthermore, the structure of the holding tool for use in producing of laminated glass is simplified and it is possible to provide an inexpensive holding tool for use in producing of laminated glass minimally having trouble.

According to the third aspect of the invention, since the flexible supporting member is used, the position for supporting the bag member against the frame is narrowed to a supportable range of the flexible supporting member to be restricted to a prescribed range as compared with the case where the bag member is supported by the elastic member alone. Therefore, a difference in stress mainly applied to face and reverse sides of the bag member by the frame may be reduced. Furthermore, since the supporting position is restricted to a prescribed range, when a plurality of holding tools of the invention are arranged for producing laminated glass, contact between bag members of adjacent holding tools may be prevented. As a result, it is possible to provide a holding tool for use in producing of laminated glass in which an unbonded body is minimally damaged.

According to the fourth aspect of the invention, since the non-stretching supporting member is used, while allowing deformation of a portion of the bag member where the unbonded body is placed, the positional shift from the frame may be suppressed to a prescribed range. Therefore, it is possible to support the bag member in opening/closing the opening and to retain an appropriate distance between the frame and the bag member during movement of the bag member. As a result, it is possible to provide a holding tool for use in producing of laminated glass improved in handling properties in which, for example, the unbonded body is easily placed in and taken out of the bag member.

According to the fifth and sixth aspects of the invention, it is possible to provide a holding tool for use in producing of laminated glass capable of efficiently evacuating the bag member even when the unbonded body is in a deep curved shape.

According to the seventh aspect of the invention, it is possible to provide a device for producing laminated glass in which the pre-pressing may be evenly performed on unbonded bodies in deep curved shapes having various curved shapes and crack is prevented in the pre-pressing process.

According to the eighth and ninth aspects of the invention, since the evacuating port is provided in the first area disposed in the center part of the bag member and not in contact with the unbonded body, even when the unbonded body is in a deep curved shape, the evacuation is performed in a balanced manner both in the center part of the bag member where the unbonded body is placed (an inside part of a bent portion of the unbonded body) and the end parts of the bag member (outside parts of the bend of the unbonded body) so as to reduce the quantity of air remaining in the bag member, and hence, the close adhesion between the bag member and the unbonded body is improved. Accordingly, stress applied to an end of the unbonded body is reduced as well as a pressing force applied to a surface of the pre-pressed body is made even, and hence, the pre-pressing may be performed with an appropriate pressure. As a result, it is possible to provide a bag member for pre-pressing for use in producing of laminated glass capable of producing a pre-pressed body without causing a pressing failure.

According to the tenth aspect of the invention, the evacuating port is also provided in the end parts of the bag member not in contact with the unbonded body, and therefore, the evacuation is performed in a more balanced manner both in the center part of the bag member and the end parts of the bag member. Furthermore, since a plurality of evacuating ports are provided, the efficiency in the evacuation is improved, and hence, it is possible to provide a bag member for pre-pressing capable of reducing the time necessary for the pre-pressing and further preventing the occurrence of a pressing failure.

According to the eleventh aspect of the invention, even when the unbonded body in a deep curved shape is placed in the holding tool, dispersion in stress applied from the frame to the bag member is reduced, and it is possible to perform pre-pressing in which the pressing force applied to the unbonded body through the evacuation is made even. As a result, it is possible to provide a production method for laminated glass in which even pre-pressing may be performed for various curved shapes and the pre-pressed body is minimally cracked in the pre-pressing process.

According to the twelfth aspect of the invention, the evacuating port is provided in the area corresponding to the center part of the bag member and not in contact with the unbonded body. Therefore, even when the unbonded body is in a deep curved shape, the evacuation is performed in a balanced manner both in the center part of the bag member where the unbonded body is placed and the end parts of the bag member so as to reduce the quantity of air remaining in the bag member. As a result, a pressure applied to the whole surface of the pre-pressed body is made even, and it is possible to provide a production method for laminated glass capable of producing a pre-pressed body without causing a pressing failure.

According to the thirteenth aspect of the invention, since the evacuating port is provided also in the area corresponding to the end parts of the bag member and not in contact with the unbonded body, the quantity of air to be evacuated and/or timing of starting the evacuation through the first evacuating port and the second evacuating ports may be adjusted in accordance with the shape of the unbonded body. Therefore, the evacuation of the bag member where the unbonded body has been placed may be performed in a more balanced manner both in the center part and the end parts. Furthermore, since a plurality of evacuating ports are provided, the efficiency in the evacuation is improved, and hence, it is possible to provide a production method for laminated glass in which the time necessary for the pre-pressing may be reduced and the occurrence of a pressing failure may be further prevented.

BRIEF DESCRIPTION OF THE DRAWINGS

FIG. 6A illustrates a state attained before evacuation, FIG. 6B illustrates a state where air is rather reduced after starting the evacuation and FIG. 6C illustrates a state attained when the evacuation is further proceeded.

FIGS. 7A through 7D are front views illustrating other examples of the bag member, and specifically, FIG. 7A illustrates a bag member having two sides as a fourth side opposing an opening, FIG. 7B illustrates a bag member having an arc-shaped side as the fourth side opposing an opening, FIG. 7C illustrates a bag member having second, third and fourth sides together formed in an arc shape, and FIG. 7D illustrates a bag member having a spot bonded portion.

FIG. 12A illustrates a state attained before evacuation, FIG. 12B illustrates a state where air is rather reduced after starting the evacuation, and FIG. 12C illustrates a state attained when the evacuation is further proceeded.

MODE FOR CARRYING OUT THE INVENTION

Figure 10:
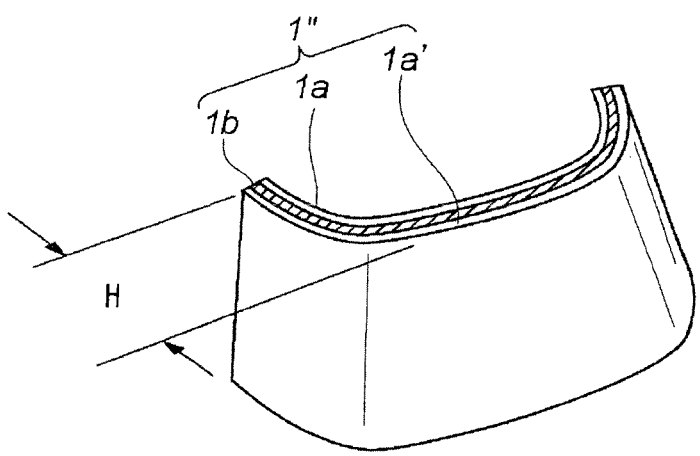
FIG. 10 is a perspective view of an automotive windshield.
Figure 11:
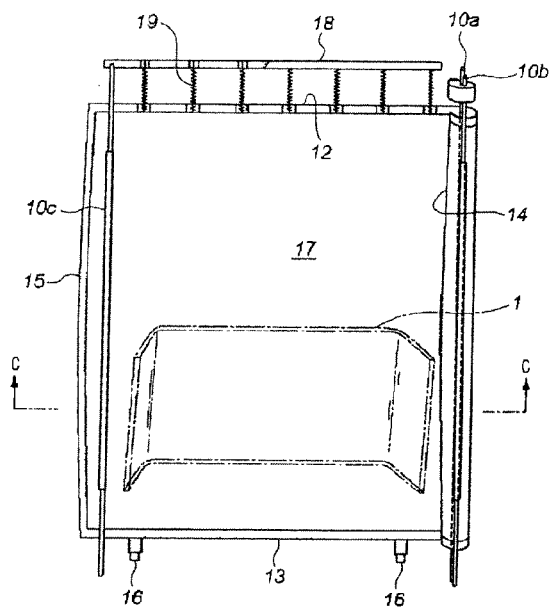
FIG. 11 is a front view of a conventional bag for use in producing of laminated glass.
Figure 12A:
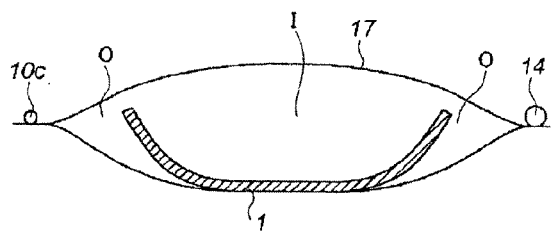
FIGS. 12A through 12C are cross-sectional views taken on line C-C of FIG. 11, and specifically.
Figure 12B:
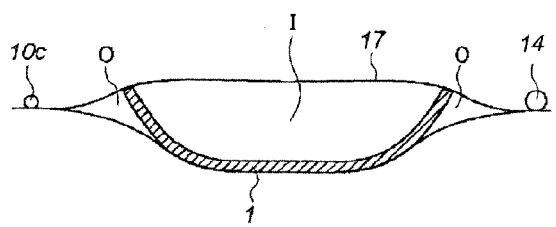
Figure 12C:
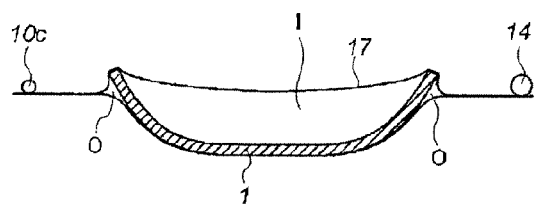

Now, an embodiment of a bag member for pre-pressing, a holding tool for use in producing of laminated glass and a device and a production method for laminated glass according to the present invention will be described with reference to the accompanying drawings. A windshield illustrated in FIG. 10 is a windshield having a large area, having double curved surfaces largely three-dimensionally bent and having a deep curved shape. A windshield in a deep curved shape may have a bend depth H much larger than 150 mm.

Incidentally, although an automotive windshield will be described in this embodiment as an example of laminated glass, laminated glass to which the bag member for pre-pressing, the holding tool for use in producing of laminated glass and the device and production method for laminated glass according to this invention are applicable is not limited to the automotive windshield. The present invention is variously applicable without spoiling effects of the invention and is applicable to any laminated glass with various curvatures, such as window glass of a railroad car, a windshield of an aircraft, a porthole, glass for a water tank, window glass of a building, security glass and bilayer glass.

The automotive windshield is, as illustrated in FIG. 10, made of laminated glass 1" including two glass sheets 1a and 1a' in a curved shape and a resin film 1b of, for example, polyvinyl butyral disposed therebetween. Incidentally, although the automotive windshield of FIG. 10 includes the two glass sheets 1a and 1a' and the one resin film 1b, the number of glass sheets may be one or plural, and the resin film may be a multilayered resin film including a plurality of films or a plurality of single-layered films may be laminated and sandwiched between the glass sheets. For example, the invention is applicable to bilayer glass in which one or more resin films are laminated on one glass sheet, multilayered laminated glass including three or more glass sheets and one or more resin films sandwiched between adjacent glass sheets, or the like. Furthermore, a covering layer of black ceramic or the like or a conductor pattern to be used as an anti-fogging part, a glass sensor, an antenna conductor or the like may be printed on a front or rear surface of the glass sheet, or the glass sheet may be provided with a known functional coating layer. Furthermore, it goes without saying that any of known functional resin films having various functions can be used as the resin film.

A production method for the laminated glass used as the automotive windshield will be described with reference to FIG. 1. First, an unbonded body in which one or a plurality of glass sheets, each of which has been cut into a desired shape, and a resin film which similarly cut into the desired shape and laid us with adjacent glass sheets is prepared. The unbonded body 1 is placed in a bag member 4 for pre-pressing (S1), and an opening of the bag member 4 is sealed (S2). Next, air remaining in the bag member 4 is evacuated so as to press the unbonded body 1 with the bag member 4 (S3). At the same time as the evacuation, or before or after starting the evacuation, heating is started (S4), so that the unbonded body 1 may be pressed and heated by using a pre-pressing device. After desired heating and pressing, a glass laminated body having been subjected to the pre-pressing is taken out of the bag member 4 (S5) to be dealt with as a pre-pressed body 1'. Furthermore, the pre-pressed body 1' is subjected to pressing by pressurizing and heating at a high temperature under a high pressure by using a pressing device such as autoclave, and thus, laminated glass 1" is produced.

Figure 2:
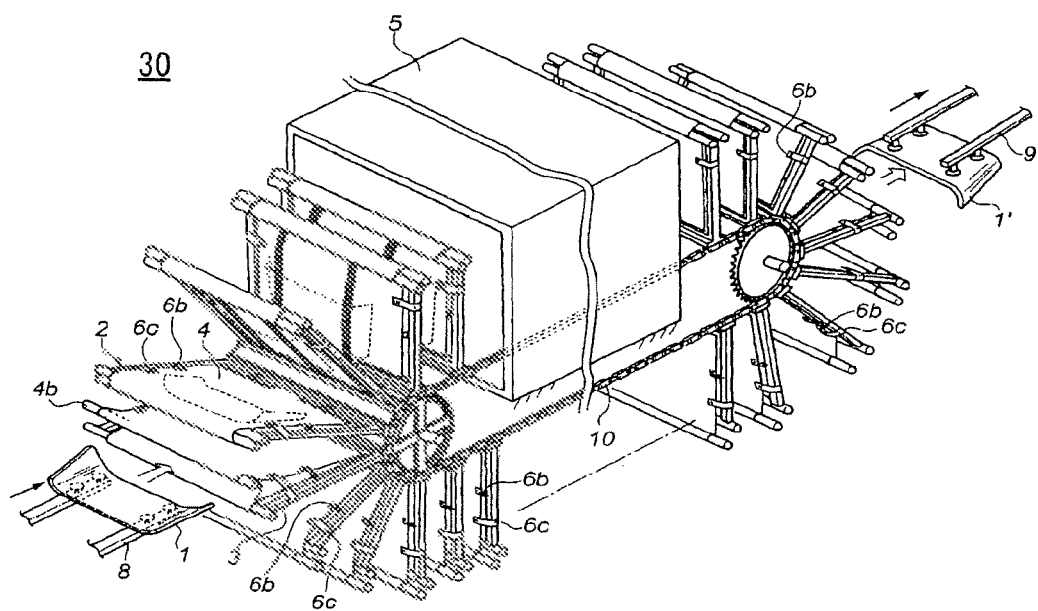
FIG. 2 is a perspective view illustrating the rough structure of a pre-pressing device.

FIG. 2 illustrates the pre-pressing device 30. The pre-pressing device 30 includes a carry-in member 8 for carrying the unbonded body 1 in the pre-pressing device 30, a holding tool 2 for use in producing of laminated glass, a heating chamber 5, a carry-out member 9 for carrying the pre-pressed body 1' out of the pre-pressing device, and two pairs of endless chains 10 for driving the holding tool. The pre-pressing device further includes a mechanism for driving the holding tool, a mechanism for opening/closing an opening and a decompressing mechanism such as a vacuum pump, all of which are not illustrated in the drawing.

Figure 3:
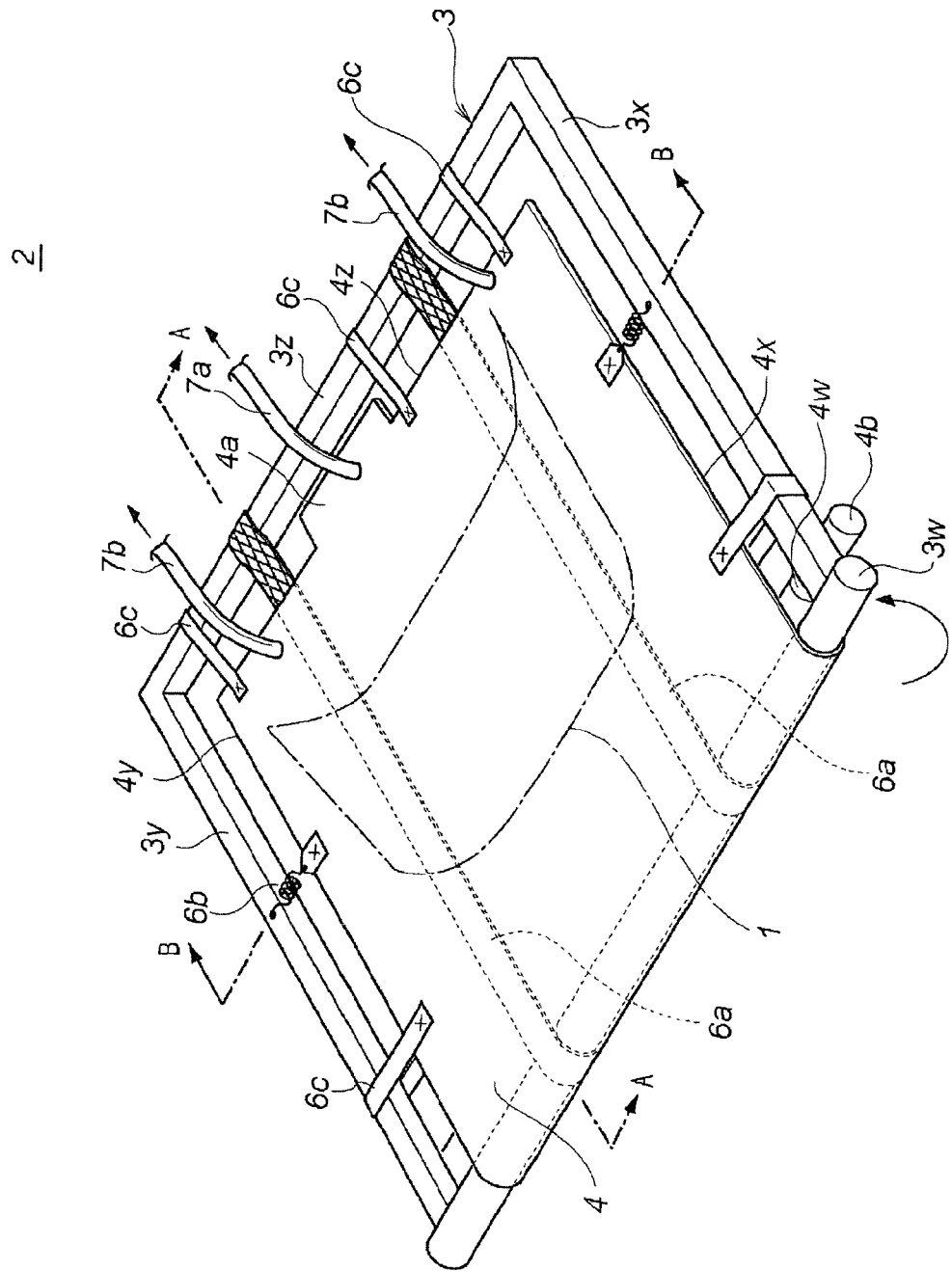
FIG. 3 is a perspective view illustrating an example of a holding tool for use in producing of laminated glass in which a bag member is sealed.

As illustrated in FIG. 3, the holding tool 2 for use in producing of laminated glass includes a frame 3 and a bag member 4. The bag member 4 includes two substantially rectangular rubber-coated cloths, which are laid on each other with one side not adhered to each other to be used as an opening and the other three sides sealed through vulcanization adhesion or the like as described in detail later. The opening of the bag member 4 has two lips, one of which is provided with a rod-shaped member 4b. When the lip provided with the rod-shaped member 4b is laid on the other lip so as to cover it as illustrated with an arrow, the opening is sealed, so that the bag member 4 may be sealed up. On a carry-in side for the unbonded body (i.e., on the left hand side in FIG. 2), the mechanism for opening/closing the opening pulls up the rod-shaped member 4b so as to open the bag member 4, and thus, the unbonded body 1 may be placed therein. On the other hand, on a carry-out side for the pre-pressed body (i.e., on the right hand side in FIG. 2), the lip provided with the rod-shaped member 4b moves due to its own weight, and thus, the opening is unsealed. Furthermore, the bag member 4 has first and second evacuating ports 7a and 7b described later disposed in the vicinity of a side 4z opposing the opening and sealed. Accordingly, the bag member 4 has flexibility sufficient for placing the bent unbonded body 1 therein and airtightness sufficient for decompressing and evacuating inside the bag member 4 when the opening is sealed.

A pre-pressing process will now be described with reference to FIGS. 1 through 3. On the carry-in side of the pre-pressing device 30, the unbonded body 1 is placed into the bag member 4 of the holding tool 2 for use in producing of laminated glass by the carry-in member 8 (step S1 of FIG. 1). In placing the unbonded body 1 in the bag member 4, the opening of the bag member 4 is opened/closed by the movement of the rod-shaped member 4b (step S2 of FIG. 1), which will be described in detail later. The bag member 4, where the unbonded body 1 has been placed and whose opening has been sealed, is evacuated by the decompressing mechanism (not shown). The evacuated bag member 4 is brought into close contact with the unbonded body 1 due to the atmospheric pressure, so as to press the unbonded body 1 (step S3 of FIG. 1). In addition to a pressure applied to the unbonded body 1 due to the press by the bag member 4, the unbonded body 1 is further heated by a heating device (not shown), and thus, the pre-pressing is performed. Furthermore, since the bag member 4 is thus pressed, the unbonded body is prevented from moving inside the bag member 4 while it is being carried inside the pre-pressing device 30, and thus, the unbonded body 1 may be stably held effectively. It is noted that although the heating in the pre-pressing process is generally performed after applying the pressure, the heating may be preliminarily performed before applying the pressure as far as the evacuation of the bag member 4 is not prevented.

The holding tool 2 for use in producing of laminated glass in which the unbonded body 1 has been placed is attached by the frame 3 between the two pairs of endless chains 10 at equal intervals with a plurality of other holding tools 2 for use in producing of laminated glass. Each of the endless chains 10 is stretched between two gears so as to rotate along a vertical plane. The plural holding tools 2 for use in producing of laminated glass are rotatively moved by a holding tool driving device provided near the endless chains 10. The holding tool 2 is evacuated by the decompressing device (not shown) while it is moving, so that the unbonded body 1 is pressed inside the bag member 4.

Figure 1:
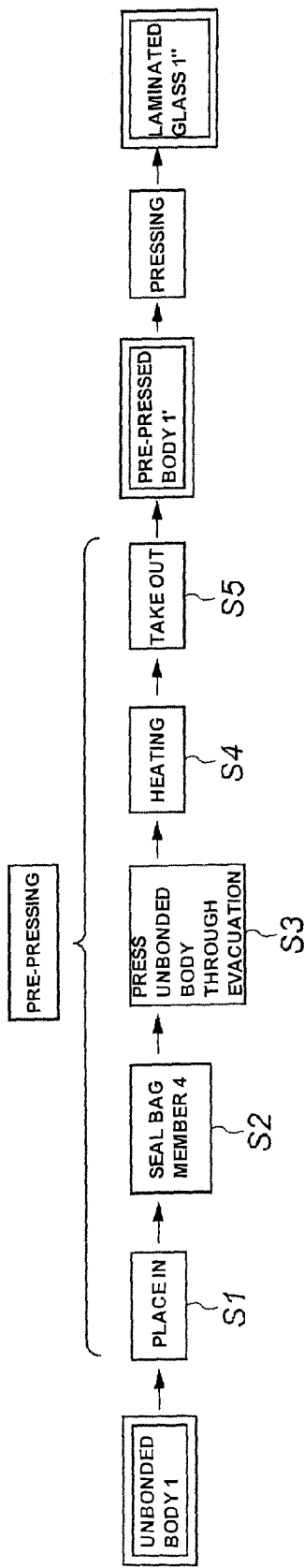
FIG. 1 is a flowchart illustrating producing procedures for laminated glass.

Furthermore, the holding tool 2 for use in producing of laminated glass in which the unbonded body 1 has been placed is subjected to the heat treatment in the heating chamber 5 disposed on a rotatively moving line path (step S4 of FIG. 1). The holding tool 2 having passed the heating chamber 5 is cooled before reaching the carry-out side of the pre-pressing device 30.

The opening of the bag member 4 having reached a carry-out position is unsealed by the rod-shaped member 4b moving by its own weight, and the pressure within the bag member 4 becomes equal to the atmospheric pressure. Subsequently, the pre-pressed body 1' having been subjected to the pre-pressing is taken out of the bag member 4 of the pre-pressing device 30 through the opening by the carry-out member 9 (step S5 of FIG. 1). The holding tool 2 thus having become empty passes below the pre-pressing device 30 so as to move to a position where the carry-in member 8 is disposed, and the aforementioned procedures are repeated. The pre-pressed body 1' having been completed in the pre-pressing is fed to the pressing device (the autoclave) for performing the next process, and the pressing is performed therein so as to produce the laminated glass 1".

In this embodiment, the pre-pressing device 30 in which the plural bag members 4 are attached through the frame 3 to the two pairs of endless chains 10 rotating along the vertical plane so as to be rotated adjacently to one another is used. The present invention is applicable to a pre-pressing device in which a plurality of bag members 4 are vertically provided on endless chains 10 rotating along a horizontal plane as described in Patent Document 1. Alternatively, without providing the bag members 4 with a driving device such as the endless chains, one or a plurality of holding tools 2 for use in producing of laminated glass may be carried, in a batch type manner, into and out of a space where heating and depressurizing may be performed for subjecting the unbonded body 1 to the pre-pressing.

Figure 4:
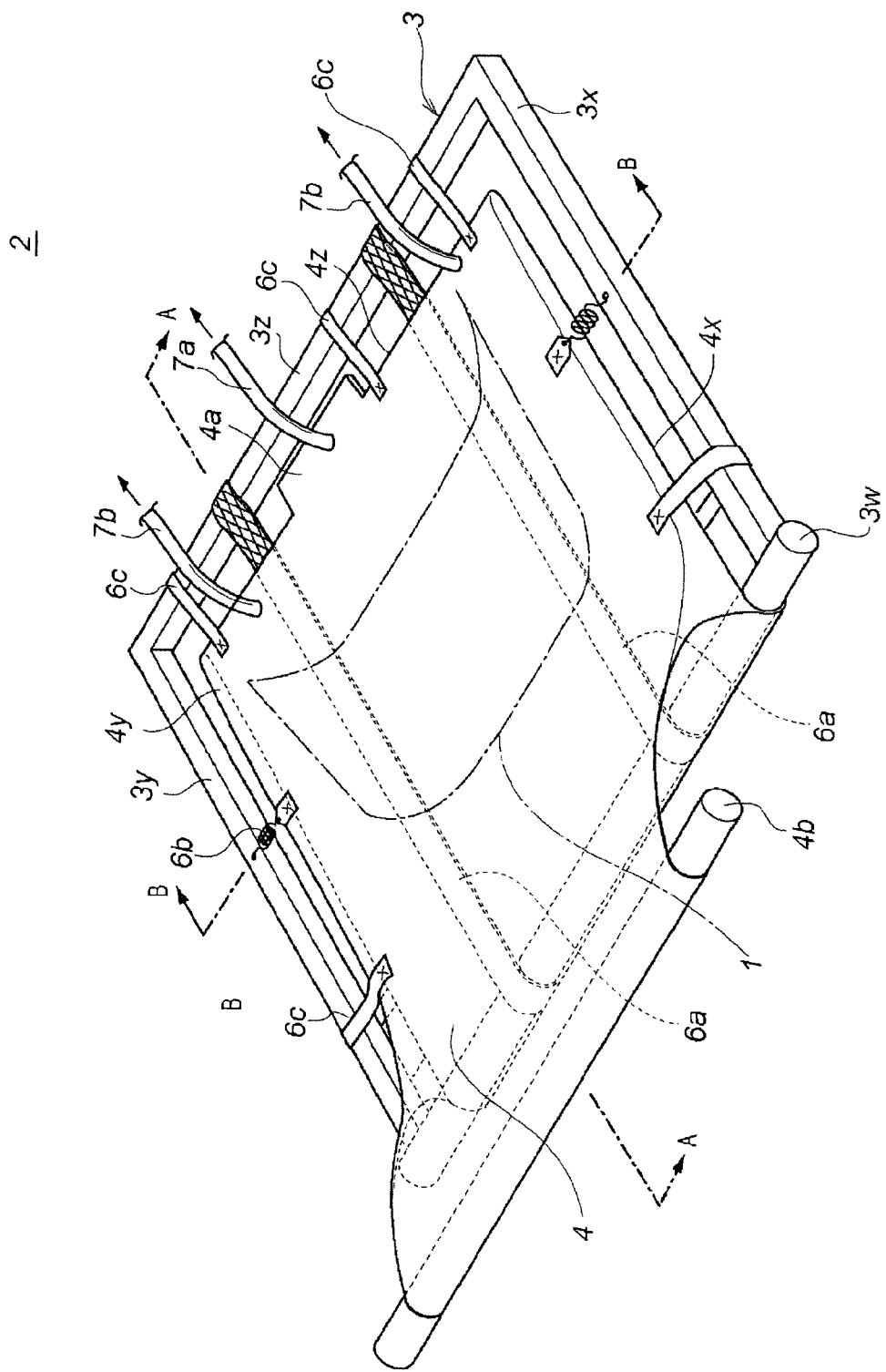
FIG. 4 is a perspective view illustrating an example of the holding tool for use in producing of laminated glass in which the bag member is opened.

Next, the structure of the holding tool 2 for use in producing of laminated glass will be described in detail with reference to FIGS. 3 and 4. FIG. 3 illustrates the holding tool 2 for use in producing of laminated glass in a state where the unbonded body 1 is placed in the bag member 4 and the bag member 4 is sealed up. Also, FIG. 4 illustrates the holding tool 2 for use in producing of laminated glass in a state where the opening of the bag member 4 is opened.

The bag member 4 included in the holding tool 2 for use in producing of laminated glass is in the shape of an envelope made of two substantially rectangular rubber-coated cloths laid on each other, and has an extended portion 4a at substantially the center on the side 4z opposing the opening. One side of the bag member 4 (that is, a first side 4w) is not adhered so as to work as the opening, and the remaining three sides are sealed through the vulcanization adhesion or the like. Hereinafter, among the three sealed sides, sides extending from ends of the first side 4w corresponding to the opening are respectively designated as a second side 4x and a third side 4y, and a side opposing the first side 4w is designated as a fourth side 4z.

The opening of the bag member 4 has two lips, one of which is longer than the other, and the longer lip is provided with the rod-shaped member 4b. The length of the rod-shaped member 4b is preferably slightly larger than the width of the frame 3.

The frame 3 is in a substantially rectangular shape extending along the outline of the bag member 3 and includes a frame member 3w corresponding to the first side 4w, a frame member 3x corresponding to the second side 4x, a frame member 3y corresponding to the third side 4y and a frame member 3z corresponding to the fourth side 4z. The frame member 3x and the frame member 3y respectively correspond to a first frame member and a second frame member opposing each other on the sealed periphery of the bag member 4. Furthermore, the frame member 3w corresponds to a third frame member provided in parallel to the opening of the bag member 4. The frame member 3z corresponds to a fourth frame member opposing the opening of the bag member 4. The bag member 4 in the substantially rectangular shape is provided with the extended portion 4a in the vicinity of the center of the fourth side 4z opposing the opening.

The first side 4w corresponding to the opening of the bag member 4 is provided so as to protrude beyond the third frame member 3w of the frame 3 together with the rod-shaped member 4b. On the other hand, the sealed sides of the bag member 4 are supported inside the frame 3. In other words, the first frame member 3x, the second frame member 3y and the fourth frame member 3z of the frame 3 are disposed so as to surround the outside of the second through fourth sealed sides 4x, 4y and 4z of the bag member 4.

On the first side 4w corresponding to the opening of the bag member 4, one of the two lips is longer than the other and the longer lip is provided with the rod-shaped member 4b. After placing the unbonded body 1 in the bag member 4, the longer lip of the first side 4w goes beyond the third frame member 3w together with the rod-shaped member 4b as illustrated with an arrow in FIG. 3 so as to overlap and cover the other lip. Furthermore, the longer lip is turned on the other surface (i.e., the rear surface in the drawing) of the frame 3, and thus, the opening of the bag member 4 is sealed so as to place the bag member 4 in a sealed state.

On the carry-out side of the pre-pressing device 30, the rod-shaped member 4b provided on one lip of the opening of the bag member 4 is lifted up by, for example, the mechanism for opening/closing the opening, and thus, the bag member 4 is opened as illustrated in FIG. 4. Furthermore, on the carry-out side of the pre-pressing device 30, the one lip provided with the rod-shaped member 4b moves by its own weight, so as to unseal the opening and place the bag member in an open state. When the bag member is in the open state, it is possible to place the unbonded body 1 in the bag member 4 or to take out the pre-pressed body 1' having been completed in the pre-pressing from the bag member 4.

In the aforementioned pre-pressing device 30, the unbonded body 1 is inserted into the bag member 4 in such a manner that the vertical direction of the resultant laminated glass 1" is parallel to the moving direction in the device. Thus, the unbonded body may be substantially bilaterally symmetrical about an evacuating device or the heating device, so that it may be evenly pressed and heated. Furthermore, when the unbonded body is inserted into and placed in the bag member 4 bilaterally symmetrically, the interval between the adjacent holding tools 2 may be reduced inside the pre-pressing device 30, which makes a contribution to increase of productivity and improvement of takt time, resulting in realizing efficient and energy-saving producing.

Although the unbonded body 1 is inserted into the bag member 4 in such a manner that the vertical direction in mounting the unbonded body 1 as the windshield is parallel to the moving direction in the exemplary case described herein, the unbonded body 1 may be inserted into the bag member 4 in such a manner that the lateral direction thereof accords with the moving direction depending upon a structure for fixing the holding tool, the evacuating ports and the heating mechanism.

The bag member 4 is supported on the frame 3 with helical springs 6b, that is, an elastic body. Each spring 6b is provided between a side and a corresponding frame member, such as between the second side 4x and the second frame member 3x or between the third side 4y and the third frame member 3y, so that the bag member 4 where the unbonded body 1 is placed may be suspended from the frame 3.

Preferably, the helical springs 6b are provided on the second side 4x and the third side 4y, where the periphery of the bag member 4 more freely moves against the frame 3, in positions closer to the fourth side 4z than their centers. On the other hand, since the first side 4w corresponding to the opening in this embodiment is not suspended from the first frame member 3w, there is no need to provide the helical spring 6b on this side. The helical springs 6b are provided between the second side 4x and the third side 4y of the bag member 4 and the first frame member 3x and the second frame member 3y, respectively. Therefore, it is possible to adjust a distance between the frame 2 and the bag member 4. In other words, the bag member 4 is suspended movably in parallel to a holding face formed by the frame 3.

Furthermore, the helical springs 6b suspend the bag member 4 movably in parallel and normal directions to the holding face formed by the frame 3. In this case, when the bag member 4 is evacuated, the two rubber-coated cloths are to come in close contact with each other on the second side 4x and the third side 4y, but due to the curved shape of the unbonded body 1 placed therein, there arises a difference in the shape between the two rubber-coated cloths of the bag member 4. At this point, even when the periphery of the flexible bag member 4 changes due to deflection caused in the bag member 4, the bag member 4 may move against the frame 3 in the parallel and the normal directions to the holding face so as to adjust the distance from the frame 3.

Accordingly, as compared with conventional support of the bag member 4 with a belt or the like, stress applied from the rubber-coated cloths to the unbonded body 1 is reduced, so as to reduce dispersion in stress applied from the frame 3 to the bag member 4. As a result, a pressing force applied to the unbonded body 1 through the evacuation may be made even in the pre-pressing. Furthermore, the pre-pressing may be evenly performed on the unbonded bodies 1 in various curved shapes, so as to reduce a crack failure caused in the pre-pressing process.

In this manner, in the case where the elastic bodies of the helical springs 6b are used, even when the unbonded body 1 is in a deep curved shape or a shape having more complicated double curved surfaces, since the periphery of the bag member 4 is movable against the frame 3, the distance from the frame 3 may be easily adjusted. The distance at which the bag member 4 is suspended from the frame 3 is autonomously determined by the force applied from the frame 3 to the bag member 4 and the force of deforming the elastic bodies, and thus, the position for holding the bag member 4 is stabilized. Furthermore, owing to the helical springs, the holding tool 2 for use in producing of laminated glass having a simple structure and minimally having trouble may be inexpensively provided.

On the other hand, the supporting member is not limited to the helical springs, but any member can be used as far as it may support the bag member 4 with the distances between the second side 4x and the third side 4y of the bag member 4 and the first frame member 3x and the second frame member 3y of the frame 3 adjustable. For example, a fluid cylinder urged toward the first frame member 3x or a tool urged by using a guide rail toward the first frame member 3x can be used.

As the spring (elastic body), a steel helical spring usable at a temperature of 120° C. through 150° C. and preferably at a temperature up to 200° C. within the heating chamber 5 is suitably used. When the elastic body such as the helical spring is used, a simple structure for suspending the bag member 4 may be obtained. Furthermore, when an appropriate material is selected, there is no need to cool the supporting member even when the holding tool 2 for use in producing of laminated glass is heated as a whole. Moreover, since the helical spring may exhibit a sufficient function as the supporting member with a simple mechanism and easy maintenance, it may be suitably used from the viewpoint of thermal stability and cost. On the other hand, as an elastic body other than the spring, for example, any of known elastic supporting means such as rubber or a cylinder sealing a compressible fluid therein may be applied.

Figure 5:
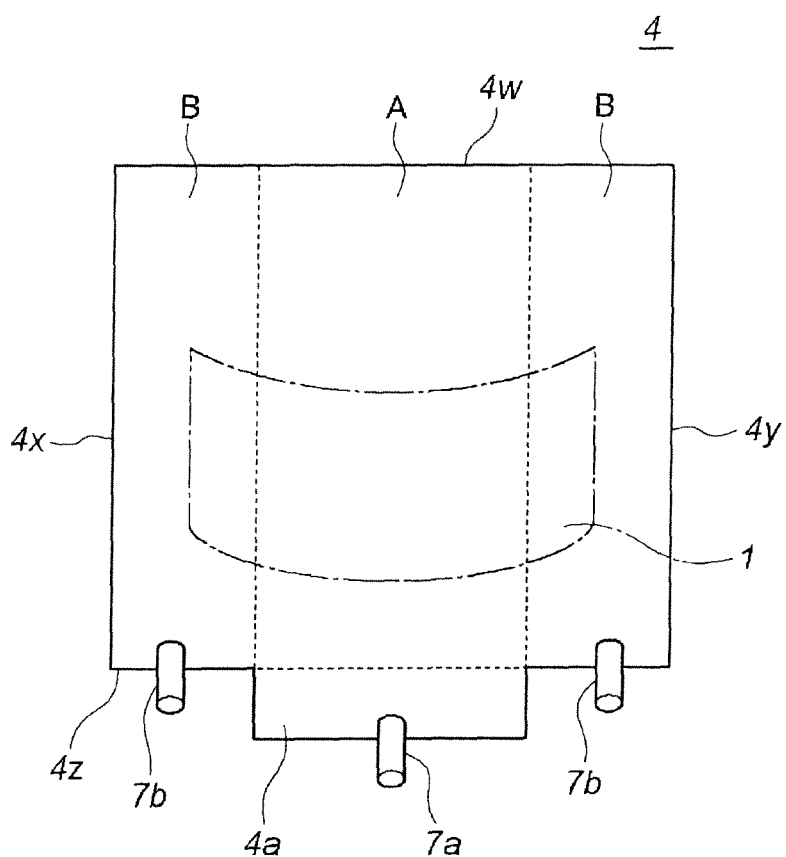
FIG. 5 is a front view of a bag member.

FIG. 5 is a schematic plan view of the bag member according to this invention. The bag member 4 is a bag member in a flat shape and is provided with the extended portion 4a in the vicinity of the center of the side 4z opposing the opening of the circumference of the bag member. Furthermore, the extended portion 4a is provided with the first evacuating port 7a for evacuating air from the inside of the bag member. As illustrated in the drawing, out of four areas obtained by dividing, by a length obtained by equally dividing the first side 4w corresponding to the opening of the bag member 4 into four pieces, an area formed by connecting the ends of the first frame member 3x and the second frame member 3y to each other in the holding tool 2 and an area formed by connecting the ends of the second side 4x and the third side 4y on the periphery extending from the ends of the first side 4w in the bag member 4 along a direction perpendicular to the first side 4w, the extended portion 4a is formed by extending two center areas (corresponding to an area A illustrated in FIG. 5).

More specifically, the extended portion is formed by extending the center part A demarcated by a center portion of a line included in the first side 4w on the side of the opening and forming the two center areas of the four equally divided areas (i.e., a center portion of an upper side of a solid line in FIG. 5) and lines passing through the ends of the center portion of the line and parallel to the second side 4x and the third side 4y (i.e., broken lines extending in the vertical direction in FIG. 5). The extended length of the extended portion 4a is set so that the unbonded body 1 may not be brought into contact with the first evacuating port 7a disposed in the extended portion 4a even when the unbonded body 1 is inserted into a position the closest to the extended portion 4a. Although the extended portion 4a extends from the entire center part A on the side 4z opposing the opening in this embodiment, the present invention is not limited to this, and the width and the extended length of the extended portion 4a may be appropriately designed as far as the evacuation through the evacuating port 7a is not prevented.

The width of the opening may be appropriately set in accordance with the size of a glass sheet to be inserted therein, and in consideration of the general size of an automotive windshield, when the width is 1500 through 3000 mm, the bag member may be applicable to most of automotive windshields mass produced. Preferably, when the width is 1600 through 2400 mm, it may be suitably used for producing of glass in a deep curved shape, and when the width is 1800 through 2200 mm, it may be preferably directly used in existing pre-pressing equipment. At this point, a second area described later (corresponding to an area B of FIG. 5) preferably within 30% of the whole width from the peripherys parallel to the first and second frame members 3x and 3y or within 800 mm from the peripherys and more preferably within 25% or within 600 mm of the whole width. On the other hand, when the second area is within 10% of the whole width or within 400 mm, an effect attained by dividing the areas is reduced, and when it is within 5% or within 200 mm, there is a minimum difference from an effect attained by the conventional position of the evacuating port.

The second evacuating port 7b may be further provided in a portion other than the center part A where the first evacuating port 7a is provided. The portion other than the center part A corresponds to each of the end parts B demarcated by areas other than the center part A out of the four areas obtained by dividing the bag member 4 and is in a position not in contact with the unbonded body 1. Furthermore, since the first and second evacuating ports 7a and 7b are provided in areas not in contact with the unbonded body 1 in this manner, the unbonded body 1 may be prevented from being damaged through contact with the first evacuating port 7a.

Furthermore, when the first and second evacuating ports 7a and 7b are provided in both the center part A and the end parts B as illustrated in FIGS. 3 through 5, the evacuation may be rapidly performed. In this case, when the evacuation through the first and second evacuating ports 7a and 7b is started in a time sequence manner so that the evacuation may be performed through the first evacuating port 7a first and that the evacuation through the second evacuating ports 7b may be started after reducing air remaining in an area where the unbonded body 1 is placed, the evacuation may be more efficiently performed.

Although the first and second evacuating ports 7a and 7b are provided in both the center part A and the end parts B in FIGS. 3 and 5, even when the first evacuating port 7a is provided in the center part A alone, the time necessary for the evacuation may be reduced as compared with the conventional technique where evacuating ports are provided in the both end parts B. Furthermore, it is possible to provide the evacuating ports in the center part A and in one of the end parts B.

Figure 6A:
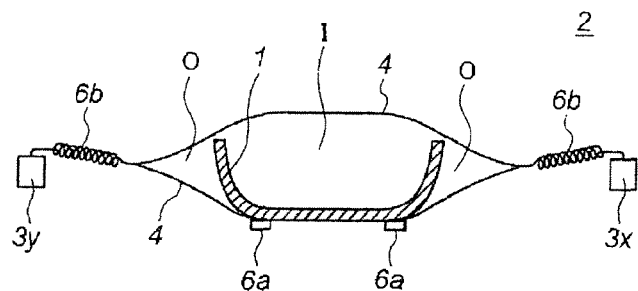
FIGS. 6A through 6C are cross-sectional views taken on line B-B of FIG. 3, and specifically.
Figure 6B:
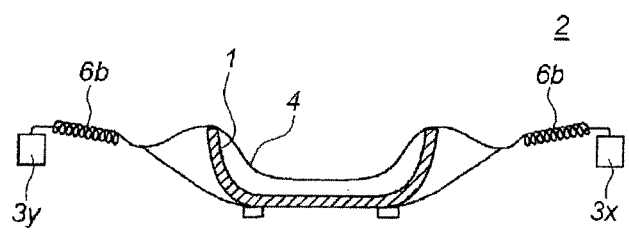
Figure 6C:
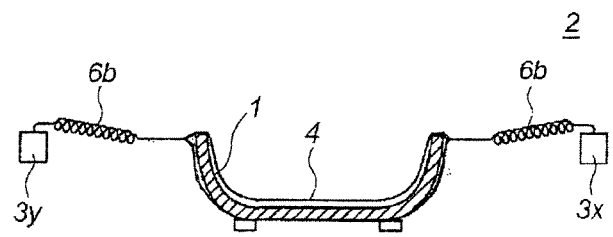

FIGS. 6A through 6C are schematic diagrams illustrating the evacuation performed in the pre-pressing of the unbonded body 1 in a deep curved shape by using the bag member 4 for use in producing of laminated glass according to this invention. FIGS. 6A through 6C are cross-sectional views of the bag member 4 for use in producing of laminated glass all taken on line B-B of FIG. 3, and specifically, FIG. 6A illustrates a state attained before the evacuation, FIG. 6B illustrates a state attained when the evacuation has started and air is rather reduced and FIG. 6C illustrates a state attained when the evacuation has been further proceeded.

When the evacuation is started first through the first evacuating port 7a provided in the extended portion 4a of the bag member 4, a center space I and peripheral spaces O are evacuated. When the evacuation is further proceeded and one of the rubber-coated cloths (i.e., an upper rubber-coated cloth in the drawings) of the bag member 4 comes into contact with the unbonded body 1, the evacuation is proceeded mainly from the center space I alone, resulting in attaining the state of FIG. 6B. At this point, the evacuation through the second evacuating ports 7b provided in the end parts of the bag member 4 is started. As a result, the evacuation through the first and second evacuating ports 7a and 7b is proceeded, and thus, the state of FIG. 6C where the unbonded body 1 is evenly pressed as a whole so as to come into close contact with the bag member 4.

When the evacuation is proceeded as illustrated in FIGS. 6A through 6C, the periphery of the bag member 4 is drawn toward the center in accordance with the curved shape of the unbonded body 1, and hence, the shape of the periphery of the flexible bag member is changed due to deflection caused in the bag member 4. At this point, the periphery of the bag member 4 is to move in directions away from the first and second frame members 3x and 3y of the frame 3. In this case, the distance from the frame 3 may be easily adjusted in the bag member 4 of this invention, and hence, there arises no problem in the deformation or the evacuation of the bag member 4. This is because the bag member 4 is suspended from the first and second frame members 3x and 3y of the frame 3 with the helical springs 6b and hence the periphery of the bag member 4 may be freely moved against the frame 3.

Furthermore, even when the unbonded body 1 is in a deep curved shape and there is a large quantity of air in the large center space I inside the bag member 4, since the first evacuating port 7a is provided in a position corresponding to this space, the evacuation may be rapidly performed.

Furthermore, although the evacuation through the first evacuating port 7a and the evacuation through the second evacuating ports 7b are started in a time series manner in this embodiment, a similar effect may be attained by controlling the evacuation so as to, for example, start the evacuation through the first evacuating port 7a and the evacuation through the second evacuating ports 7b at the same time with the evacuation through the second evacuating ports 7b halted halfway or to evacuate a smaller quantity of air through the second evacuating ports 7b than through the first evacuating port 7a. Moreover, the number of evacuating ports is not limited to that described herein but may be appropriately changed, and a small quantity of air may be evacuated through a part of the second evacuating ports 7b before starting the evacuation through the first evacuating port 7a as far as the effects of the present invention are not spoiled.

Also, since the second evacuating ports 7b are provided in the positions in the end parts B of the bag member 4 not in contact with the unbonded body 1, the quantity of air to be evacuated and/or the timing of starting the evacuation through the first evacuating port 7a and the second evacuating ports 7b may be adjusted in accordance with the shape of the unbonded body 1, and therefore, the evacuation may be performed in a balanced manner in the center part A and the end parts B of the bag member 4 where the unbonded body 1 is placed.

Furthermore, the evacuation may be performed in a balanced manner in the center part A and the end parts B of the bag member 3 so as to reduce the quantity of air remaining in the bag member 3. In addition, when the timing of the evacuation and the quantity of air to be evacuated through the second evacuating ports 7b are controlled after starting the evacuation through the first evacuating port 7a, air may be definitely evacuated from the center part A and a deeply bent part that are more difficult to evacuate than the end parts B, and thus, evener pre-pressing may be realized. As a result, the pressure applied to the whole pre-pressed body 1' may be made even, so that the pre-pressed body 1' may be produced without causing a pre-pressing failure. Also, when the evacuation is performed through both the first evacuating port 7a and the second evacuating ports 7b, the efficiency in the evacuation is improved so as to reduce the time necessary for the pre-pressing as well as to further prevent the occurrence of a pressing failure.

In the case where the heating is started after starting the evacuation through the first evacuating port 7a, the degree of vacuum may be increased before the heating, and hence the close adhesion between the bag member 4 and the unbonded body 1 is improved. The timing for starting the heating and the pressurizing may be appropriately modified in accordance with the structure of the devices, and the heating may be started first. In either case, when the heating and the pressurizing of the pre-pressed body 1' are performed at the same time at least for a prescribed period of time, the heating is performed with the glass sheets 1a and 1a' and the resin film in close contact with each other. As a result, a production method for laminated glass in which the pressing of the pre-pressed body 1' may be more definitely and evenly performed is provided. Furthermore, since the heating energy may be propagated to the pre-pressed body 1' without through an air space, the heat may be efficiently used so as to make a contribution to energy saving.

Next, dispersions of the shape of the bag member 4 will be described with reference to FIGS. 7A through 7D. From the viewpoint of easiness in the producing, the bag member 4 is preferably in a substantially polygonal flat shape, and apart from the substantially rectangular shape illustrated in FIGS. 3 through 5, bag members in different shapes, for example, as illustrated in FIGS. 7A through 7C can be used. It is noted that a substantially polygonal flat shape herein includes shapes basically similar to a polygon such as a triangle, a square or a pentagon and having a side of the polygon or a face of the bag including a curve or a curved face.

The bag member 4 of FIG. 7A has two sides 4z1 and 4z2 as a fourth side opposing the opening and is in a pentagonal shape like a home plate having the two sides 4z1 and 4z2, a first side 4w, a second side 4x and a third side 4y. The bag member 4 of FIG. 7B has an arc-shaped side 4z as a fourth side opposing the opening and is in a shape demarcated by the arc-shaped side 4z, a first side 4w, a second side 4x and a third side 4y. Furthermore, the bag member 4 of FIG. 7C has a second side, a third side and a fourth side integrated as an arc and is in a substantially semi-circular shape including the arc and a first side 4w.

When the bag member 4 has the side 4z opposing the opening in a shape, as illustrated in FIGS. 7A through 7C, in which the unbonded body 1 may not be inserted into a deep portion thereof, the first evacuating port 7a disposed at the center is provided in a position out of a portion where the unbonded body 1 may be placed. Therefore, the end of the unbonded body 1 may be easily prevented from coming into contact with the first evacuating port 7a, and thus, an effect similar to that attained by providing the extended portion 4a may be exhibited. The first evacuating port 7a disposed at the center may be provided as one evacuating port as illustrated in FIG. 7A or the like or provided as a plurality of evacuating ports as illustrated in FIG. 7B.

As illustrated in FIG. 7D, a structure not including the extended portion 4a illustrated in FIG. 5 or the like may be employed. The bag member 4 of FIG. 7D is in a substantially square shape having first through fourth sides 4w, 4x, 4y and 4z, and includes, instead of the extended portion 4a, means for placing and fixing the unbonded body 1 in the bag member 4. In the shape of FIG. 7D, spot bonded portions 11 formed through the vulcanization adhesion of spots of the rubber-coated cloths used as the material for the bag member are provided, as illustrated in the drawing, in lower portions at the center of the substantially square bag member 4 as the fixing means for the unbonded body 1, so as to restrict the movement toward a deeper side (a lower side in the drawing) of the bag member 4, and thus, the unbonded body 1 is prevented from coming into contact with the first evacuating port 7a. In this case, the first evacuating port 7a may be provided in a position lower than the spot bonded portions 11 where the unbonded body 1 is not placed.

As described so far, the first evacuating port 7a may be disposed in a position close to the center line of the bag member 4 but away from the opening so as not to come into contact with the glass sheets 1*a* and 1*a*'. Furthermore, the second evacuating port 7*b* may be disposed in a position away from the opening and in the vicinity of the first or second frame member 3*x* or 3*y*. Specifically, in employing a shape having corners at the ends of the fourth side 4*z* as illustrated in FIG. 7A, 7B or 7D, the second evacuating ports 7*b* are preferably formed in the vicinity of the corners. Moreover, when the second evacuating ports are disposed within 800 mm, more preferably 600 mm and further preferably 400 mm from the corners, the bag member 4 may be rapidly evacuated while appropriately following the deep curved shape together with the first evacuating port 7*a*.

Figure 8:
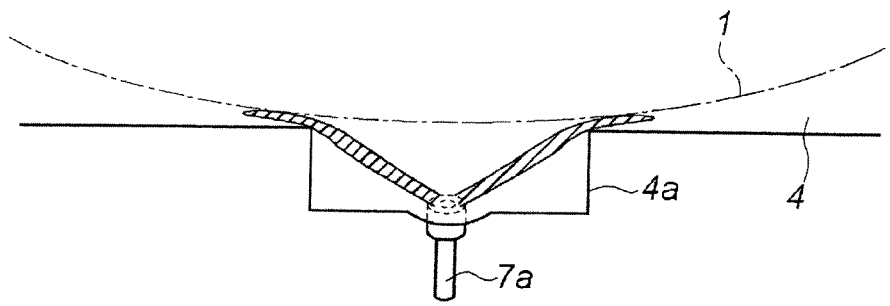
FIG. 8 is an enlarged view of a part in the vicinity of an extended portion of FIG. 3.

The first evacuating port 7*a* disposed in the extended portion 4*a* is preferably provided with an air spacer of a rope or the like in a portion communicating with a pit inside the extended portion 4*a* as illustrated in FIG. 8. This is for preventing evacuated air flow from being blocked through close adhesion of the extended portion 4*a* communicating with the pit. Furthermore, the bag member 4 in any of the shapes of FIGS. 7A through 7D is also preferably provided with an air spacer in the vicinity of the evacuating port 7. In this manner, an effect similar to that attained by the extended portion 4*a* may be expected also in the case of FIG. 8.

In the structure illustrated in FIG. 3, the holding tool 2 for use in producing of laminated glass includes flexible belts 6*a* corresponding to a flexible supporting member for supporting the bag member 4. Two flexible belts 6*a* are stretched between the third frame member 3*w* and the fourth frame member 3*z* over the holding face in the same direction substantially perpendicular to the opening. The length of each flexible belt 6*a* is larger than the distance between the third frame member 3*w* and the fourth frame member 3*z*, and when the frame 3 is placed in a horizontal state and the bag member 4 having the unbonded body 1 placed therein suspended with the helical springs 6*b* is to move downward by its own weight, the bag member is supported in an appropriate range not too low by the flexible belts 6*a*.

Figure 9:
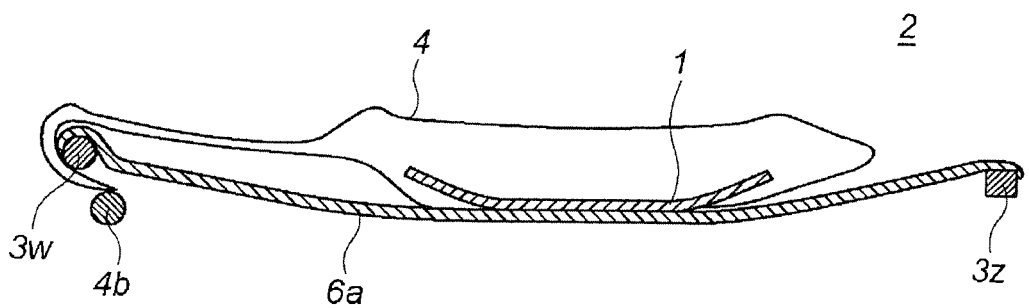
FIG. 9 is a cross-sectional view taken on line A-A of FIG. 3.

The lower surface of the bag member 4 is movable in the normal direction to the holding face formed by the respective members of the frame 3 down to a position slightly lower than the holding face and is freely movable in the horizontal direction to the holding face. Therefore, when the bag member 4 is evacuated and the two rubber-coated cloths are in close contact with the unbonded body 1, a difference between the stress applied to the upper rubber-coated cloth and that applied to the lower rubber-coated cloth is smaller as illustrated in FIG. 9 corresponding to a cross-sectional view taken on line A-A of FIG. 3 than in the case where the bag member 4 is not movable downward. As a result, the pressure applied to the pre-pressed body 1' is made even, and the occurrence of crumpling in the opening of the bag member 4 is suppressed. Accordingly, a press failure otherwise caused by air leakage through the opening of the bag member 4 may be reduced, so as to improve the quality of the pre-pressed body 1'.

Furthermore, as compared with the case where the bag member 4 is suspended with the helical springs 6*b* alone, in the position for supporting the bag member 4 against the frame 3 by using the flexible belts 6*a*, the range of deformation is restricted to be a prescribed range on the side where the flexible belts 6*a* are stretched. Therefore, stress applied from the frame 3 to mainly the face and reverse sides of the bag member 4 is made even.

Moreover, in the case where the pre-pressing is performed by using the pre-pressing device 30 in which a large number of holding tools 2 for use in producing of laminated glass are disposed adjacent to one another as illustrated in FIG. 2, the holding tools 2 for use in producing of laminated glass are disposed at small intervals. Also in this case, the flexible belts 6*a* may restrict the movement of each bag member 4 at least toward the side where the flexible belts 6*a* are stretched. Therefore, a contact between bag members placed in adjacent holding tools 2 may be prevented. Similarly, also when the holding tools 2 for use in producing of laminated glass are moved from the horizontal state to the normal state, the unbonded bodies 1 placed in the bag members 4 of the adjacent holding tools 2 for use in producing of laminated glass may be prevented from colliding with each other to be damaged.

As a result, it is possible to reduce the intervals of attaching the supporting members 2 in the pre-pressing device 30, and hence, a holding tool and a producing device for use in producing of laminated glass attaining high productivity without causing a crack failure of the unbonded bodies 1 may be provided.

Although the two flexible belts 6*a* are stretched in the same direction between the third frame member 3*w* and the fourth frame member 3*z* in this embodiment, the method for stretching them is not limited to this. The number may be one, three or more, and the frames on which they are fixed may be the first and second frame members 3*x* and 3*y*. Also, they may be stretched along a direction not parallel to the frames, and a plurality of flexible belts 6*a* may be stretched to cross each other.

As the material for the flexible belts 6*a*, any of known materials usable under heating conditions of the autoclave and the pre-pressing device 30, and preferably, a material with heat resistance such as polyester fiber or aromatic polyamide fiber is used so as to withstand a temperature of 120° C. through 150° C. and preferably 200° C. inside the heating chamber 5. Furthermore, the flexible belt 6*a* is preferably in a shape with a width of 30 through 100 mm and a thickness of 1 through 3 mm.

Moreover, the holding tool 2 for use in producing of laminated glass may be provided with non-stretching belts 6*c* corresponding to non-stretching supporting members for suspending the bag member 4 from a plurality of frame members out of the first frame member 3*x*, the second frame member 3*y* and the fourth frame member 3*z* of the frame 3. Each non-stretching belt 6*c* is in a cylindrical shape opened in parallel to the second side 4*x* and the third side 4*y* of the bag member 4 and is attached to the periphery of the bag member 4. The non-stretching belt 6*c* is fit with the frame 3 with the first frame member 3*x* or the second frame member 3*y* inserted into the cylindrical shape. At this point, each non-stretching belt 6*c* has a length with room sufficient for the inserted member of the frame to move in a prescribed range, and is preferably provided plural in number in positions close to the first side 4*w*. On the fourth side 4*z* of the bag member 4, the non-stretching belt 6*c* may be attached directly to the side 4*z* or may be attached to the extended portion 4*a*. Furthermore, although the range of movement is adjusted by using the cylindrical belts in this embodiment, another means can be used for the adjustment, and a spring, a cylinder, a damper or a guiding member can be used, or such means can be used in combination.

When the non-stretching belts 6*c* are provided, the positional relationship between the frame 3 and the bag member 4 may be appropriately adjusted even in a process where the unbonded body 1 is not placed therein. For example, in the pre-pressing device 30 of FIG. 2, the holding tool 2 for use in producing of laminated glass is placed in a position where the first side 4*w* corresponding to the opening of the bag member 4 is disposed to be lower than the fourth side 4*z* during the movement along the endless chains 10 from the carry-out side for the pre-pressed body 1' to the carry-in side for the unbonded body 1. At this point, if the non-stretching belts 6c for restricting the distance between the frame 3 and the bag member 4 are not provided, the bag member 4 slips down beyond the frame 3. Then, when the bag member 4 reaches the carry-in position for the unbonded body 1, the unbonded body 1 may not be smoothly placed in the bag member 4 if the frame 3 is shifted from the bag member 4, and hence, it is necessary to correct the position of the bag member 4.

On the other hand, when the non-stretching belts 6c are provided, the positional shift of the bag member 4 from the frame 3 is restricted within a prescribed range. Therefore, also during the movement from the carry-out position for the pre-pressed body 1' to the carry-in position for the unbonded body 1, there is no need to correct the position of the frame 3 against the bag member 4. Accordingly, the unbonded body 1 may be smoothly placed in the bag member 4 merely by lifting the rod-shaped member 4b to open the opening of the bag member 4.

Moreover, the non-stretching belt 6c provided on the side of the opening of the bag member 4 may align, to a prescribed range, the position of the opening of the bag member 4 against the frame 3 along the lateral direction (i.e., the direction parallel to the first side 4z). Accordingly, the unbonded body 1 and the pre-pressed body 1' may be easily placed in and taken out. Furthermore, since the unbonded body 1 is placed in the bag member 4 without causing lateral shift, the stress to the unbonded body 1 may be made even when the unbonded body 1 is pressed, and it is possible to reduce, for example, a failure such as damage caused by an excessive pressure applied to one end of the glass sheets 1a and 1a'.

As described so far, when the non-stretching belts 6c are provided, while allowing the deformation of the portion of the bag member 4 where the unbonded body 1 is placed, the positional shift of the other portions from the frame 3 may be suppressed to a prescribed range. As a result, it is possible to support the bag member 4 in opening/closing the opening and to retain the appropriate distance between the frame 3 and the bag member 4 during the movement of the holding tool 2. Thus, when the unbonded body 1 is placed in, conveyed with and taken out of the holding tool 2 for use in producing of laminated glass, a crack failure otherwise caused through contact of the bag member 4 may be reduced as well as the unbonded body may be easily dealt with, resulting in realizing a holding tool for use in producing of laminated glass with high productivity.

In the holding tool 2 for use in producing of laminated glass according to this invention, in opening/closing the opening of the bag member 4, the bag member 4 is supported with the springs 6b against the frame 3, and the length along the lateral direction (i.e., the direction parallel to the first side 4w) of the bag member 4 (i.e., the width thereof) is adjustable. Therefore, the degree of freedom in the deformation of the bag member 4 is so large that it may largely opened. As a result, the unbonded body 1 may be more easily placed in the bag member 4 and the pre-pressed body 1' may be more easily taken out of the bag member 4. Furthermore, due to the deflection caused in the bag member 4 in accordance with the bend of the unbonded body 1 placed in the bag member 4, the bag member 4 follows the bend of the unbonded body 1 also after placing it therein. Therefore, the unbonded body 1 may be placed in the bag member 4 while reducing the occurrence of unwanted stress applied to the unbonded body 1.

Furthermore, in the carry-in position for the unbonded body 1, the rod-shaped member 4b is lifted so that the unbonded body 1 may be placed in the bag member 4 by the carry-in member 8. At this point, since the bag member 4 is supported by the flexible belts 6a on its lower surface, the unbonded body 1 placed in the bag member 4 is prevented from braking through contact with another holding tool 2 for use in producing of laminated glass disposed below.

Moreover, during the movement of the holding tool 2 for use in producing of laminated glass from the carry-in position to the carry-out position, the unbonded body 1 placed in the bag member 4 is prevented from breaking through contact with the unbonded body 1 placed in another adjacent bag member 4 owing to the presence of the flexible belts 6a.

Also, on the carry-in side of the pre-pressing device 30, the holding tool 2 for use in producing of laminated glass changes its posture from the horizontal state to the state facing vertically upward. However, the bag member 4 may be opened by lifting the rod-shaped member 4b, and the opening of the bag member 4 may be automatically sealed by the weight of the rod-shaped member 4b by stopping the lifting of the rod-shaped member 4b.

Furthermore, on the carry-out side of the pre-pressing device 30, the holding tool 2 for use in producing of laminated glass changes its angle from the vertical upward direction through the horizontal state to the vertically downward direction. On the carry-out side, one lip provided with the rod-shaped member 4b is moved by the weight of the rod-shaped member 4 so as to unseal the opening.

The holding tool 2 for use in producing of laminated glass having been heated in the heating chamber 5 has been substantially cooled before reaching the carry-out position. The pre-pressed body 1' having been completed in the pre-pressing is taken out in the horizontal state by the carry-out member 9, so as to be fed to the next pressing process.

Incidentally, in the embodiment illustrated in FIGS. 2 and 3 described above, the structure employing all the flexible belts 6a, the non-stretching belts 6c, the first evacuating port 7a, the second evacuating ports 7b and the like is described. It goes without saying that these composing elements exhibit their individual effects even when all of them or a specific combination of part of them are not used.

Moreover, although laminated glass in a deep curved shape is described in the embodiment, it goes without saying that the invention is applicable not only to a laminated glass material in a deep curved shape but also to producing of laminated glass in a curved shape with a curvature similar to a conventional one.

It is noted that the present invention is based upon Japanese Patent Application (No. 2008-327866), filed on Dec. 24, 2008, the entire contents of which are incorporated herein by reference.

DESCRIPTION OF REFERENCE NUMERALS

1: unbonded body
1': pre-pressed body
1": laminated glass
1a, 1a': glass sheets
1b: resin
2: holding tool for use in producing of laminated glass
3: frame
3x: first frame member
3y: second frame member
3w: third frame member
3z: fourth frame member
4: bag member
4a: extended portion
4b: rod-shaped member
4w: first side
4x: second side 4y: third side
4z: fourth side
5: heating chamber
6a: flexible belt
6b: spring
6c: non-stretching belt
7a: first evacuating port
7b: second evacuating port
8: carry-in member
9: carry-out member
10: endless chain
11: spot bonded portion
30: pre-pressing device

The invention claimed is:

1. A holding tool for use in producing of laminated glass used in a process of pre-pressing of an unbonded body in which one or a plurality of glass sheets and at least one resin film are laid up, comprising:
a bag member;
a frame; and
a supporting member for suspending the bag member from the frame,
wherein the bag member is a flat-shaped bag member made of a film with flexibility and airtightness, is provided with a sealable opening on a first side of a circumference of the bag member, has a sealed periphery on sides excluding the first side, and is provided with an evacuating port for evacuating air from the bag member,
the frame includes at least a first frame member and a second frame member disposed to oppose each other, with the first frame member and the second frame member disposed outside the periphery of the bag member, and
the bag member is suspended by the supporting member movably against the frame inside an area formed by connecting ends of the first frame member and the second frame member to each other in a plan view taken from a normal direction of a holding face formed by the first frame member and the second frame member.

2. The holding tool for use in producing of laminated glass according to claim 1, wherein the supporting member is an elastic body.

3. The holding tool for use in producing of laminated glass according to claim 1, wherein the frame further includes a third frame member provided substantially in parallel to the opening to be engaged with the bag member for sealing the bag member; and a fourth frame member disposed substantially in parallel to the opening and disposed outside the sealed periphery of the bag member, and
the holding tool further comprises a flexible supporting member suspended from a plurality of frame members out of the first through fourth frame members for supporting the bag member.

4. The holding tool for use in producing of laminated glass according to claim 1, further comprising a non-stretching supporting member for hanging the bag member on the first, second and/or fourth frame members for supporting the bag member.

5. The holding tool for use in producing of laminated glass according to claim 1,
wherein the evacuating port is provided in at least one of a first area and a second area, the first area being an area corresponding to a center part and not in contact with the unbonded body and the second area being an area corresponding to end parts and not in contact with the unbonded body out of areas of the bag member obtained by dividing, by a length obtained by equally dividing the first side into four pieces, the area formed by connecting the ends of the first frame member and the second frame member to each other in a direction perpendicular to the first side.

6. The holding tool for use in producing of laminated glass according to claim 1,
wherein the evacuating port is provided in at least one of a second area and a first area, the second area being an area corresponding to end parts, not in contact with the unbonded body and disposed within 800 mm from the periphery in parallel to the first and second frame members out of areas of the bag member obtained by dividing, in a direction perpendicular to the first side, the area formed by connecting the ends of the first frame member and the second frame member to each other, and the first area being an area corresponding to a center part excluding the second area and not in contact with the unbonded body.

7. A device for producing laminated glass using the holding tool for use in producing of laminated glass of claim 1 comprising:
evacuating means for evacuating the bag member through the evacuating port; and
heating means for heating the bag member.

* * * * *